US010935141B2

(12) United States Patent
Owens, Jr. et al.

(10) Patent No.: US 10,935,141 B2
(45) Date of Patent: Mar. 2, 2021

(54) APPARATUS AND METHOD FOR UNITIZING SPLIT RING HALVES WITH HOLDER HALVES OF A CLAMSHELL SPLIT RING MECHANICAL SEAL FACE ASSEMBLY

(71) Applicant: Flowserve Management Company, Irving, TX (US)

(72) Inventors: Glenn Robert Owens, Jr., Kalamazoo, MI (US); Mark David Volz, Scotts, MI (US); Jason Crawford Ferris, Plainwell, MI (US); Rodney Wayne Rynearson, Kalamazoo, MI (US); Ryan John Kremer, Kalamazoo, MI (US)

(73) Assignee: Flowserve Management Company, Irving, TX (US)

( * ) Notice: Subject to any disclaimer, the term of this patent is extended or adjusted under 35 U.S.C. 154(b) by 105 days.

(21) Appl. No.: 16/274,313

(22) Filed: Feb. 13, 2019

(65) Prior Publication Data
US 2020/0256469 A1  Aug. 13, 2020

(51) Int. Cl.
*F16J 15/44* (2006.01)
*F16J 15/18* (2006.01)
(Continued)

(52) U.S. Cl.
CPC ........... *F16J 15/442* (2013.01); *F16J 15/186* (2013.01); *F16J 15/28* (2013.01); *F16J 15/3252* (2013.01); *F16J 15/3272* (2013.01)

(58) Field of Classification Search
CPC .. F16J 15/44; F16J 15/442; F16J 15/16; F16J 15/50; F16J 15/52; F16J 15/18;
(Continued)

(56) References Cited

U.S. PATENT DOCUMENTS 3,025,070 A * 3/1962 Copes .................. F16J 15/38
                                                    277/370
6,485,023 B2 * 11/2002 Budrow ............... F04D 29/124
                                                    277/370
(Continued)

FOREIGN PATENT DOCUMENTS

JP         2003524735 A      8/2003

OTHER PUBLICATIONS

International Search Report and Written Opinion for International Appl. No. PCT/US2020/016402 dated Jun. 10, 2020, 11 Pages.

*Primary Examiner* — Nathan Cumar
(74) *Attorney, Agent, or Firm* — Maine Cernota & Rardin (57) ABSTRACT

A clamshell half of a split ring mechanical seal face assembly comprises a split seal ring half having circumferential and proximal surfaces that are seated against corresponding radial and axial support surfaces of a holder half. At least one extending member extends from a hole in the proximal surface to an arcuate slot in the axial support surface, or vice-versa, and thereby radially constrains the split seal ring half to remain unitized with the holder half during clamshell assembly, while permitting rotation of the split seal ring half about a shaft axis over a limited range, which in embodiments is between 2 degrees and 20 degrees. Embodiments further include a secondary seal between the holder half and split seal ring half that frictionally resists displacement of the split seal ring half.

7 Claims, 7 Drawing Sheets

(51) Int. Cl.
*F16J 15/3272* (2016.01)
*F16J 15/3252* (2016.01)
*F16J 15/28* (2006.01)

(58) Field of Classification Search
CPC ........ F16J 15/186; F16J 15/28; F16J 15/3252;
F16J 15/3256; F16J 15/3268; F16J
15/3272; F16J 3/00; F16J 3/06
USPC .......................................................... 277/345
See application file for complete search history.

(56) References Cited

U.S. PATENT DOCUMENTS

| | | | |
|---|---|---|---|
| 8,181,966 B2* | 5/2012 | Haynes | F16J 15/441 |
| | | | 277/371 |
| 2007/0056154 A1* | 3/2007 | Bjornson | F16J 15/3488 |
| | | | 29/432 |
| 2010/0264597 A1* | 10/2010 | Sato | F16J 15/3488 |
| | | | 277/358 |
| 2011/0221136 A1* | 9/2011 | Dudek | F16J 15/348 |
| | | | 277/306 |

* cited by examiner

APPARATUS AND METHOD FOR UNITIZING SPLIT RING HALVES WITH HOLDER HALVES OF A CLAMSHELL SPLIT RING MECHANICAL SEAL FACE ASSEMBLY

FIELD OF THE INVENTION

The invention relates to rotating shaft seals, and more particularly, to split end face mechanical shaft seals.

BACKGROUND OF THE INVENTION

An end face mechanical seal is a rotating shaft seal that is formed by close proximity of two flat, annular seal faces, usually referred to as a stationary seal face and a rotating seal face, in that one face is typically static and sealed to a housing or "gland," while the other face is sealed to the rotating shaft and rotates with the shaft. Due to their shapes, the seal faces are also sometimes referred to as seal "rings." The two seal faces are coaxial with the rotating shaft, whereby the long axis of the shaft is also the common axis of the annular seal faces. Accordingly, if each of the annular seal faces were considered to lie in a plane, then the planes of the annular seal faces would be parallel to each other, and both would be perpendicular to the central axis of the rotating shaft.

The seals between the stationary seal face and the gland, and between the rotating seal face and the shaft, are referred to as "secondary" seals, and may be formed by O-rings or similar elastomeric gaskets.

Traditionally the sealing surfaces of the two seal faces are lapped to a very high degree of flatness, which allows the sealing surfaces to be configured in a parallel relationship whereby they are not physically in contact with each other during operation, but are separated by a gap that can be as narrow as one micron or less. The gap itself is also annular in shape, and shares a common central axis with the two annular seal faces, and with the rotating shaft.

Normally, at least one of the seal faces is supported by a mobile element that is axially slidable, and a positive pressure is maintained between the seal faces by a spring, bellows, or other mechanism that presses the slidable seal face axially toward the other seal face. During operation, the gap between the seal faces in an end face mechanical seal is maintained by a film formed by fluid that is radially forced into the gap from either the inner or outer boundary of the gap due to differential pressure between the inner and outer boundaries. The film serves to lubricate the gap, and to resist the applied axial pressure and thereby maintain the separation of the faces, so that they do not mechanically wear against each other. However, during startup and shut down, and also in some cases if there is a loss of differential pressure, the sealing surfaces of the seal faces can come into direct, abrasive contact with each other.

There is a general tendency for seal faces to wear over time, especially for applications where rotation of the shaft is frequently started and stopped, and can eventually require replacement. In some cases, one of the seal faces is made from a wear-resistant material such as silicon carbide, while the other seal face (typically the stationary seal face) is made from a material that is intended to be worn away and replaced over time. In other cases, both seal faces are made from a wear resistant material, such that replacement is less frequent, but requires that both of the seal faces be replaced.

Installation or replacement of mechanical seals employing one-piece seal faces is an extremely time consuming and complex operation. For this reason, numerous "split ring seal" assemblies, also known as "split end face" mechanical seals, have been developed to facilitate replacement of worn seal faces. Split end face mechanical seals, which include split seal faces, sometimes referred to as "split ring" seal faces, are frequently used in liquid pumping services and are typically installed on equipment that is difficult to disassemble or is unfeasible to remove for mechanical seal repair. They are designed such that they are able to be installed and removed without disturbing the pumping equipment's integrity.

Figure 1A:
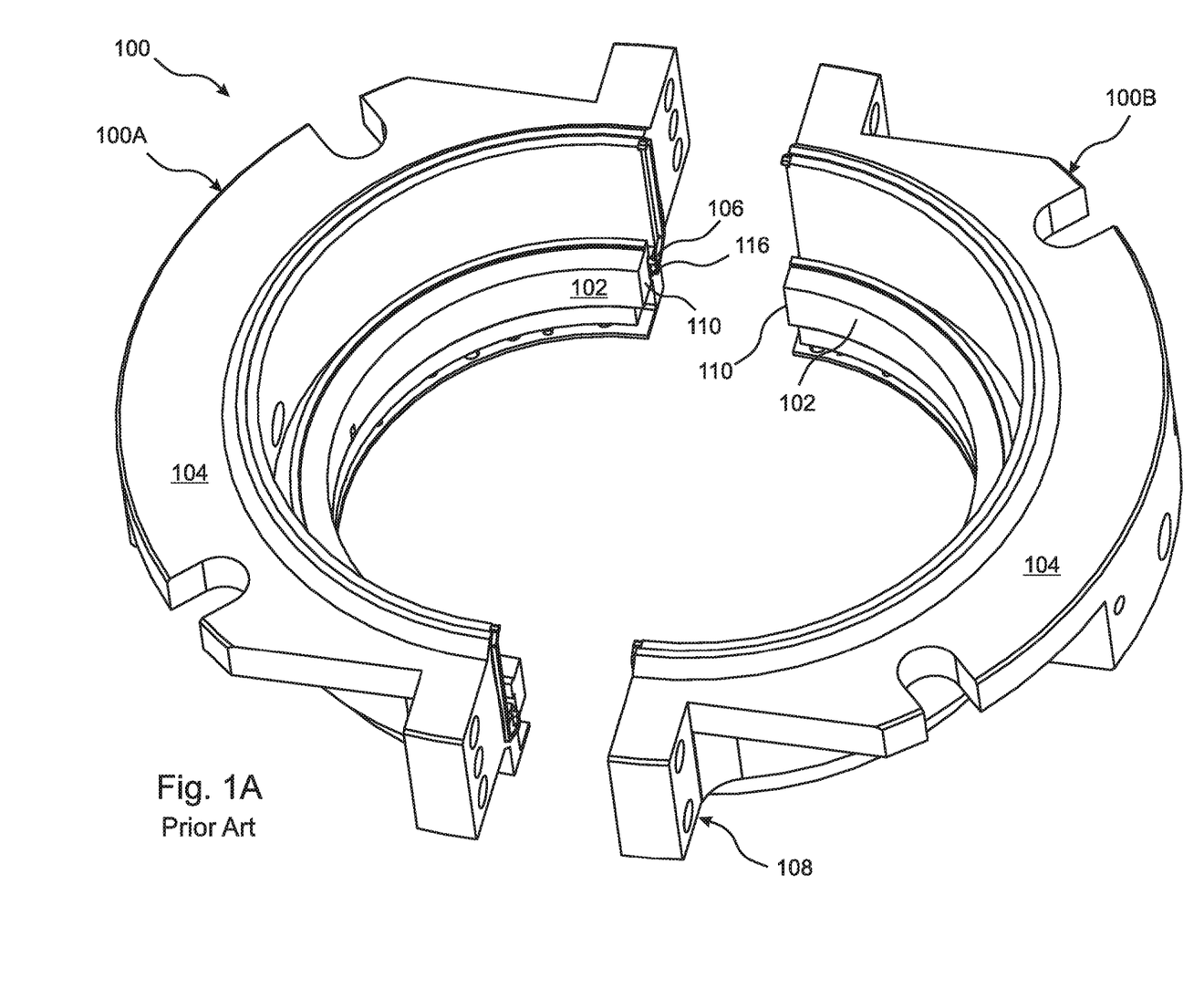
FIG. 1A is a perspective view of a typical split ring seal face assembly of the prior art, shown with the two halves of the "clamshell" separated.

A typical split ring seal face assembly adopts a "clamshell" design, whereby the rotating seal face is part of a rotating clamshell assembly and the stationary seal face is part of a stationary clamshell assembly. With reference to FIG. 1A, each clamshell assembly 100 is divided into two halves 100A, 100B. During installation, the two substantially identical halves 100A, 100B of the clamshell assembly 100 approach the central shaft (not shown) from either side and are bolted or otherwise attached together, thereby enabling installation of the split ring clamshell seal assembly 100 without need to disassemble or remove the shaft, and while minimizing impact to other structures in the vicinity of the seal.

Figure 1B:
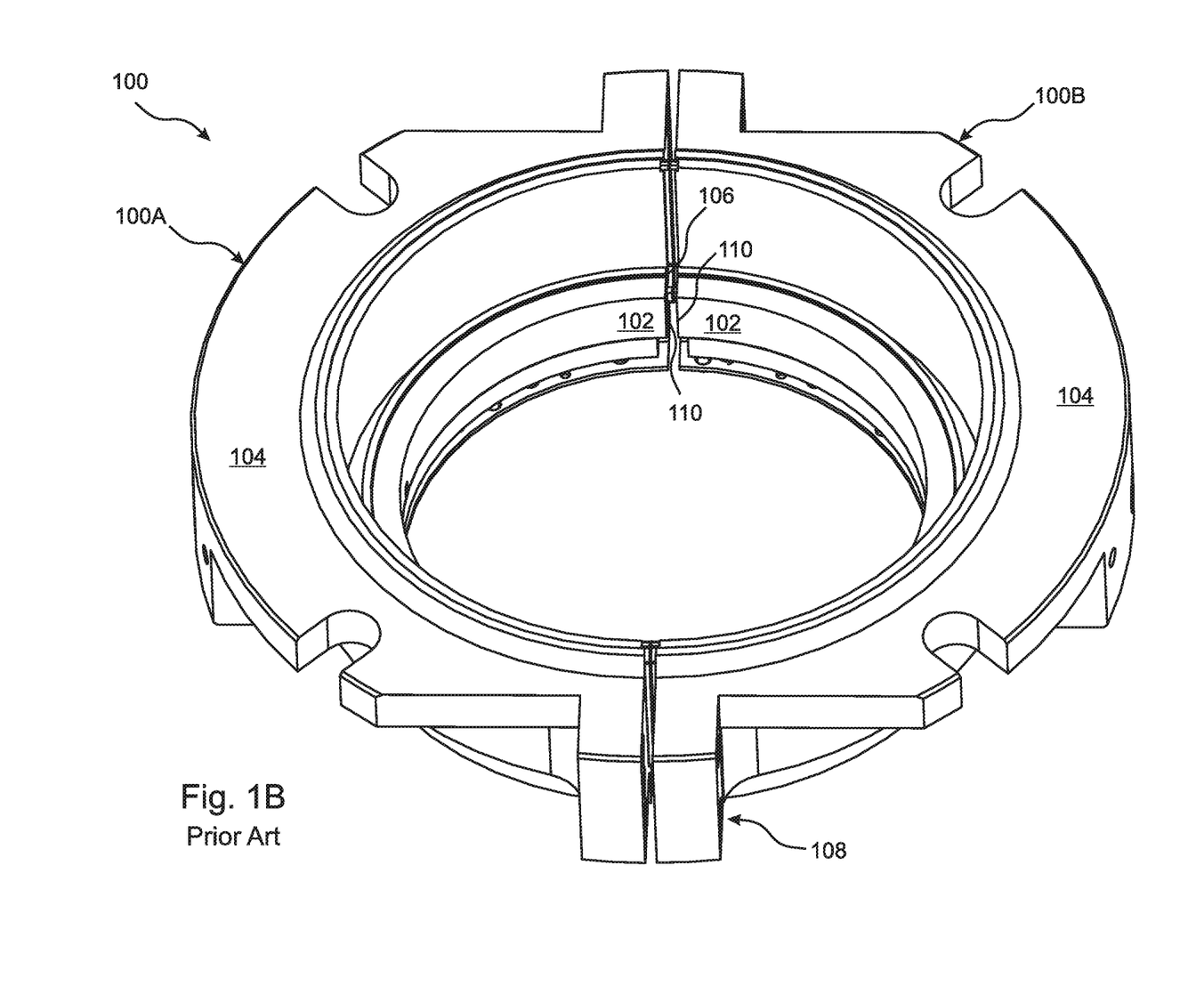
FIG. 1B is a perspective view of the prior art assembly of FIG. 1A, shown with the two halves of the clamshell assembled together.

Each half 100A, 100B of each clamshell assembly 100 includes a seal ring half 102 that is sealed by a secondary seal 106 to a holder half 104. With reference to FIG. 1B, when the two halves 100A, 100B of the clamshell assembly 100 are brought together during assembly, and the holder halves 100A, 100B are bolted 108 or otherwise attached to each other, the two seal ring halves 102 are aligned with each other and the ends 110 of the seal ring halves 102 are pressed together, forming the mechanical equivalent of a unitary seal face.

While split ring seal assemblies are recognized to possess highly desirable advantages, the radial and axial alignment of the seal ring halves with each other during assembly remains an important challenge. Typically, the seal is engineered to maintain a gap between the rotating and stationary seal faces that is less than $10^{-5}$ inches wide. Any misalignment of the halves of a split seal ring will result in a ridge at the split joint which will significantly increase process emissions and seal face wear.

Figure 1C:
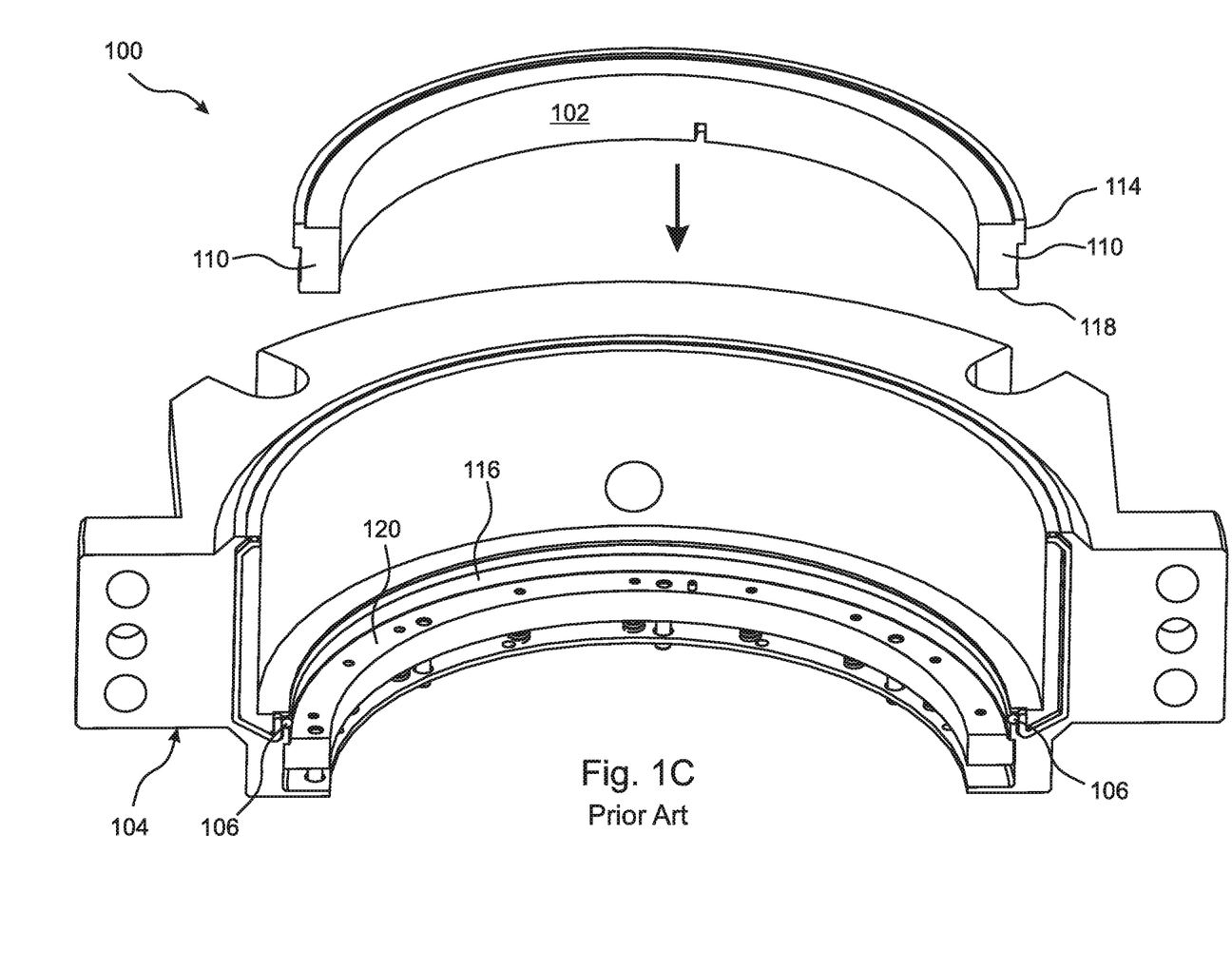
FIG. 1C is a perspective front view of one half of the clamshell of FIG. 1A, showing the seal ring half vertically separated from the holder half.

Generally, with reference to FIG. 1C, split seal designs depend on precise manufacture of the holder halves 104 to align the seal ring halves 102 axially and radially with each other. According to this approach, once a clamshell 100 is assembled outer circumferences 114 of the seal ring halves are radially seated against radial support surfaces 116 of the holder halves 104. When the rotating and stationary clamshells 100 are assembled together to complete the seal, the rotating seal ring halves 102 and stationary seal ring halves 102 press axially against each other and thereby ensure firm seating of proximal surfaces 118 of the seal ring halves against their respective axial holder half support surfaces 120. Precise manufacture of the holder half radial 116 and axial 120 support surfaces thereby accurately positions the split seal ring halves 102 radially and axially in relation to each other.

Figure 1D:
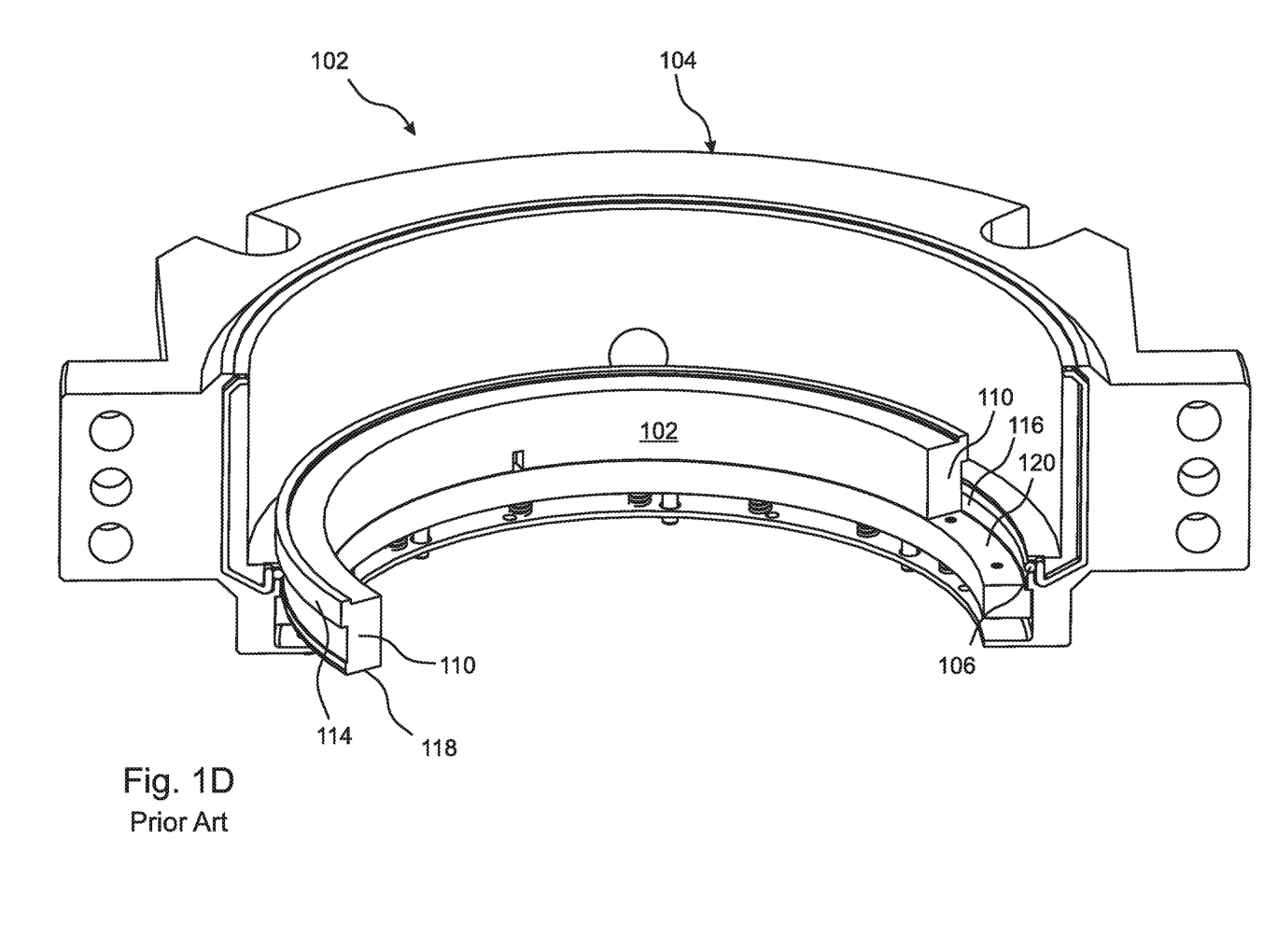
FIG. 1D is a perspective view of the half clamshell of FIG. 1C, shown with the split ring half inserted in the holder half, but rotated about the shaft axis relative to the holder half.

Notably, however, with reference to FIG. 1D, rotational movement of the split ring halves 102 about the shaft axis is not prevented even when the clamshell 100 is assembled. This ability of the split ring halves 102 to rotate about the shaft axis enables the split ring halves 102 to rotationally self-align with each other during assembly of the clamshell 100 (FIG. 1B), due to mutual pressing together of their split ends 110. If the split ring halves 102 were not able to move rotationally about the shaft axis as the holder halves 104 were attached together, then any lack of perfect rotational positioning of the split ring halves 102 by the holder halves 104 would result in too much pressure being applied between one pair of split ring ends 110, and a possible gap between the other pair of split ring ends 110.

While the split ring halves 102 are radially and axially seated and held in position against support surfaces 116, 118 after the holder halves 104 are assembled, before the holder halves 104 are assembled the split ring halves 102 are only held in place by gravitational and frictional contact with the holder halves 104, leaving the split ring halves 102 relatively free to move axially and radially away from the holder half support surfaces before the clamshell is assembled. Thus, it is typically necessary for an installing technician to avoid any impact shock to the holder halves, or contact to the stationary face halves and to manually hold the split ring halves in place within the holder halves. During installation, access to the seal ring halves becomes limited at a point before the holder halves are in place. Between the time when the technician can hold the split ring half in place and when the stationary half is bolted together, only the friction between the outside diameter of the split ring and the inside diameter of the elastomer will retain the split ring halves within the holder halves.

For smaller clamshell assemblies, the friction between the holder halves and the stationary face halves is normally sufficient to retain the stationary face halves in place as each clamshell half is assembled. However, in larger sizes the increased mass of the split stationary seal ring halves can overcome the frictional retention and allow the split stationary seal ring halves to fall out of position from within the holder halves during the last step of installation.

What is needed, therefore, is an apparatus and method for "unitizing" the split ring halves and holder halves of a split ring seal clamshell assembly, i.e. establishing a cooperative mechanical relationship between the split ring halves and their corresponding holder halves such that the split ring halves remain seated against the support surfaces of the holder halves during assembly without being manually held in place, thereby enabling easy and successful installation of the clamshell assembly onto rotating shaft equipment even in applications where the split ring seal assembly is heavy and/or access to the seal location is limited.

SUMMARY OF THE INVENTION

The present invention is an apparatus and method for "unitizing" the split ring halves and holder halves of a split ring seal clamshell assembly, i.e. establishing a cooperative mechanical relationship between the split ring halves and their corresponding holder halves such that the split ring halves remain seated against the support surfaces of the holder halves during assembly without being manually held in place, thereby enabling easy and successful installation of the clamshell assembly onto rotating shaft equipment even in applications where the split ring seal assembly is heavy and/or access to the seal location is limited.

According to the present invention, each half of each clamshell assembly includes at least one axially extending member that is inserted into a hole provided in either the axial support surface of the holder half or the "proximal" face of the split ring half (i.e. the face of the split ring half that abuts the axial support surface of the holder half), and extends axially therefrom into a slot provided in the other of the axial support surface of the holder half and the proximal face of the split ring half. The extended member thereby maintains the outer circumference of the split ring half seated against the radial support surface of the holder half. In embodiments, the extended member thereby presses the split ring half against a radially directed secondary seal, thereby frictionally resisting axial movement of the split ring half and maintaining it in place against the axial support surface of the holder half.

The slot provided in the split ring half or holder half is shaped as an arc having its center at the central axis of the shaft, so that rotation of the split ring half about the shaft is accommodated by movement of the axially extending member along a length of the slot. While this rotational movement is limited in scope by the length of the slot, it is sufficient to enable rotational self-alignment of the split ring halves during assembly of the holder halves.

In some embodiments, for each half of the clamshell, the extended member is inserted into a hole provided in the split ring half or holder half, and the split ring half is installed axially into the holder half, whereby the extended member is axially inserted into a slot provided in the holder half.

In embodiments, a plurality of axially extending members extend between the split ring half and holder half of each clamshell half. In various embodiments, the axially extending members are cylindrical in shape. In various embodiments, the slots are configured to enable rotational movement of the split ring half over a maximum angular range of between two degrees and 20 degrees.

The present invention is a unitized split seal face clamshell assembly, comprising a pair of clamshell halves configured, when assembled together, to surround a rotating shaft. Each of the clamshell halves includes a holder half having an axial support surface and a radial support surface, a split ring half having a distal annular surface configured for forming a mechanical seal, a proximal annular surface configured for seating against the axial support surface of the holder half, and an outer circumference configured for seating against the radial support surface of the holder half.

An extending member is inserted in a hole provided in one of the proximal annular surface of the split ring half and the axial support surface of the holder half, and a corresponding arcuate slot is provided in the other of the split ring half and the axial support surface of the holder half, the arcuate slot having a center of curvature that lies on the shaft axis when the clamshell halves are assembled together surrounding the rotating shaft.

The hole, slot, and extending member are configured such that when the proximal surface and the outer circumference of the split ring half are seated respectively against the axial and radial support surfaces of the holder half, the extending member extends from the hole into the arcuate slot, thereby radially fixing the split ring half relative to the holder half while permitting rotation of the split ring half relative to the holder half over a limited rotation range about the shaft axis.

In embodiments, the holder half comprises a gland half and a mobile element that is axially movable relative to the gland half, the radial support surface being formed on the gland half and the axial support surface being formed on the mobile element. In some of these embodiments, the holder half further comprises a spring or bellows configured to apply an axial force to the mobile element relative to the gland half.

Any of the above embodiments can further include a secondary seal configured, when the outer circumference of the split ring half is seated against the radial support surface, to form a seal between the holder half and the split ring half and to frictionally resist axial displacement of the split ring half relative to the holder half. In some of these embodiments, the secondary seal comprises an elastomeric member that is seated in the holder half and extends radially inward therefrom so as to press radially against the split ring half when the outer circumference of the split ring half is seated against the radial support surface.

In any of the above embodiments, the limited rotation range can be between 2 degrees and 20 degrees.

In any of the above embodiments, the extending element can be cylindrical in shape.

And in any of the above embodiments, the clamshell half can include a plurality of corresponding holes, slots, and extending members.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention is an apparatus and method for "unitizing" the split ring halves and holder halves of a split ring seal clamshell assembly, i.e. establishing a cooperative mechanical relationship between the split ring halves and their corresponding holder halves such that the split ring halves remain seated against the support surfaces of the holder halves during assembly without being manually held in place, thereby enabling easy and successful installation of the clamshell assembly onto rotating shaft equipment even in applications where the split ring seal assembly is heavy and/or access to the seal location is limited.

Figure 2:
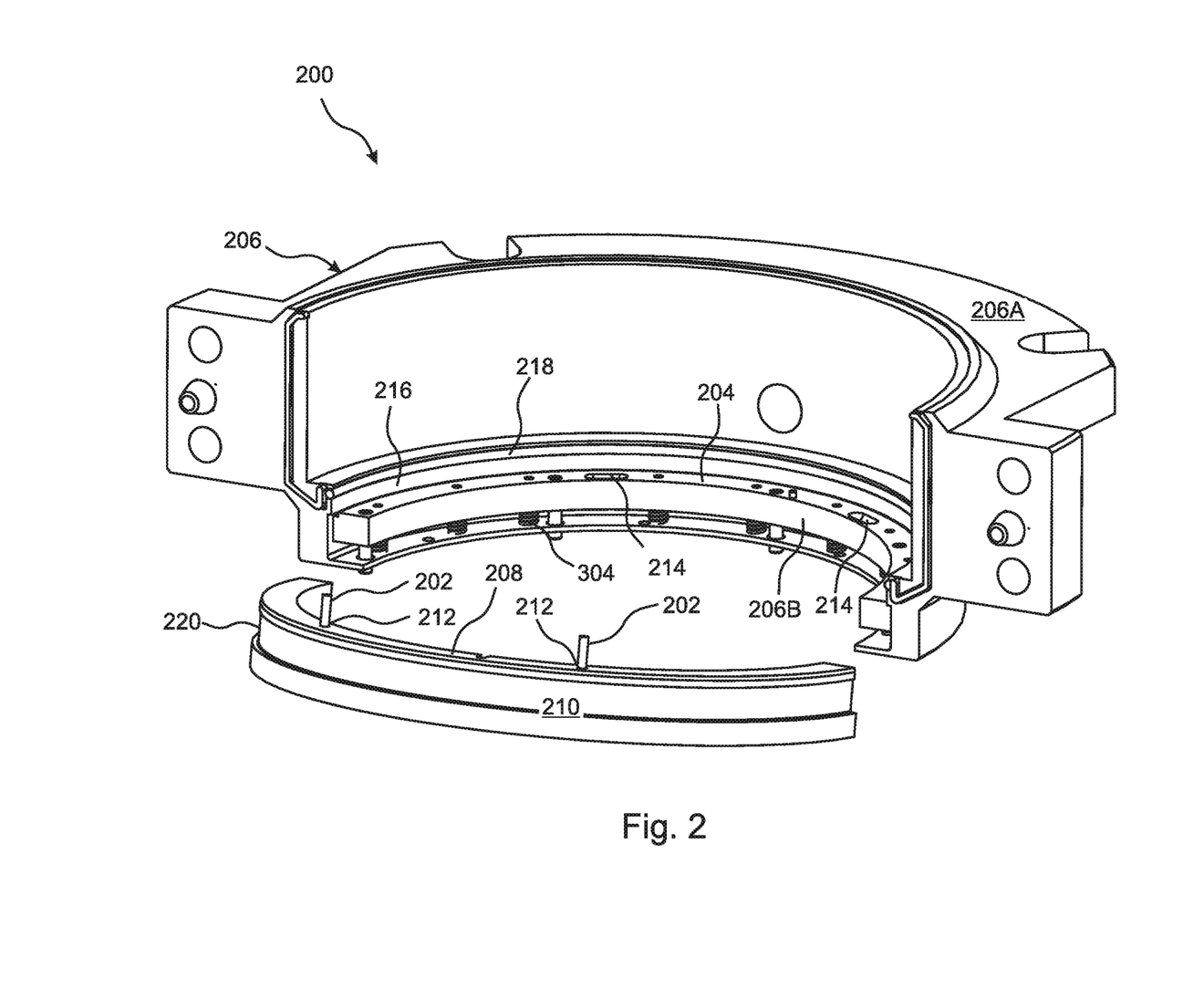
FIG. 2 is a perspective view of one half of a clamshell assembly according to an embodiment of the present invention, shown with the seal ring half removed from the holder half and inverted to display the axially extending members.

With reference to FIG. 2, which illustrates one half of a stationary clamshell assembly, each half 200 of each clamshell assembly includes one or more axially extending members 202 that maintains the outer circumference 220 of the split ring half 210 seated against the radial support surface 216 of the holder half 206. In the embodiment of FIG. 2, the holder half 206 includes a gland half 206A that includes the radial support surface 216 and an axially mobile element 206B that includes the axial support surface 204 and is axially coupled to the gland half 206A by springs 304 that advance the mobile element 206B, and thereby axially advance the stationary seal face toward the rotating seal face when the seal is assembled. In the illustrated embodiment, two extended members 202 are inserted into holes 212 provided in the "proximal" face 208 of the split ring half 210 (i.e. the face 208 of the split ring half 210 that abuts the axial support surface 204), and extend axially therefrom into slots 214 provided in the axial support surface 204 of the holder half 206. In similar embodiments, one or more extended members 202 are inserted in holes provided in the axial support surface 204 of the holder half 206 and extend axially therefrom into slots provided in the proximal face 208 of the split ring half 210. The extended members 202 thereby press the split ring half 210 against a radially directed secondary seal 218, which frictionally resists axial movement of the split ring half 210 and maintains it axially in place during assembly.

The slots 214 are shaped as arcs having their centers at the central axis of the shaft (not shown), so that rotation of the split ring half 210 about the shaft is accommodated by movement of the axially extending members 202 along lengths of the slots 214. While this rotational movement is limited in scope by the length of the slots 214, it is sufficient to enable rotational self-alignment of the split ring halves 210 during assembly of the holder halves 206.

In the embodiment of FIG. 2, the axially extending members are cylindrical in shape, and the split ring half 210 is installed axially into the holder half 206, whereby the extended members 202 are axially inserted into the slots 214 provided in the axial support surface 204 of the holder half 206.

In various embodiments, the slots 214 are configured to enable rotational movement of the split ring half 210 over a maximum angular range of between two degrees and 20 degrees.

Figure 3:
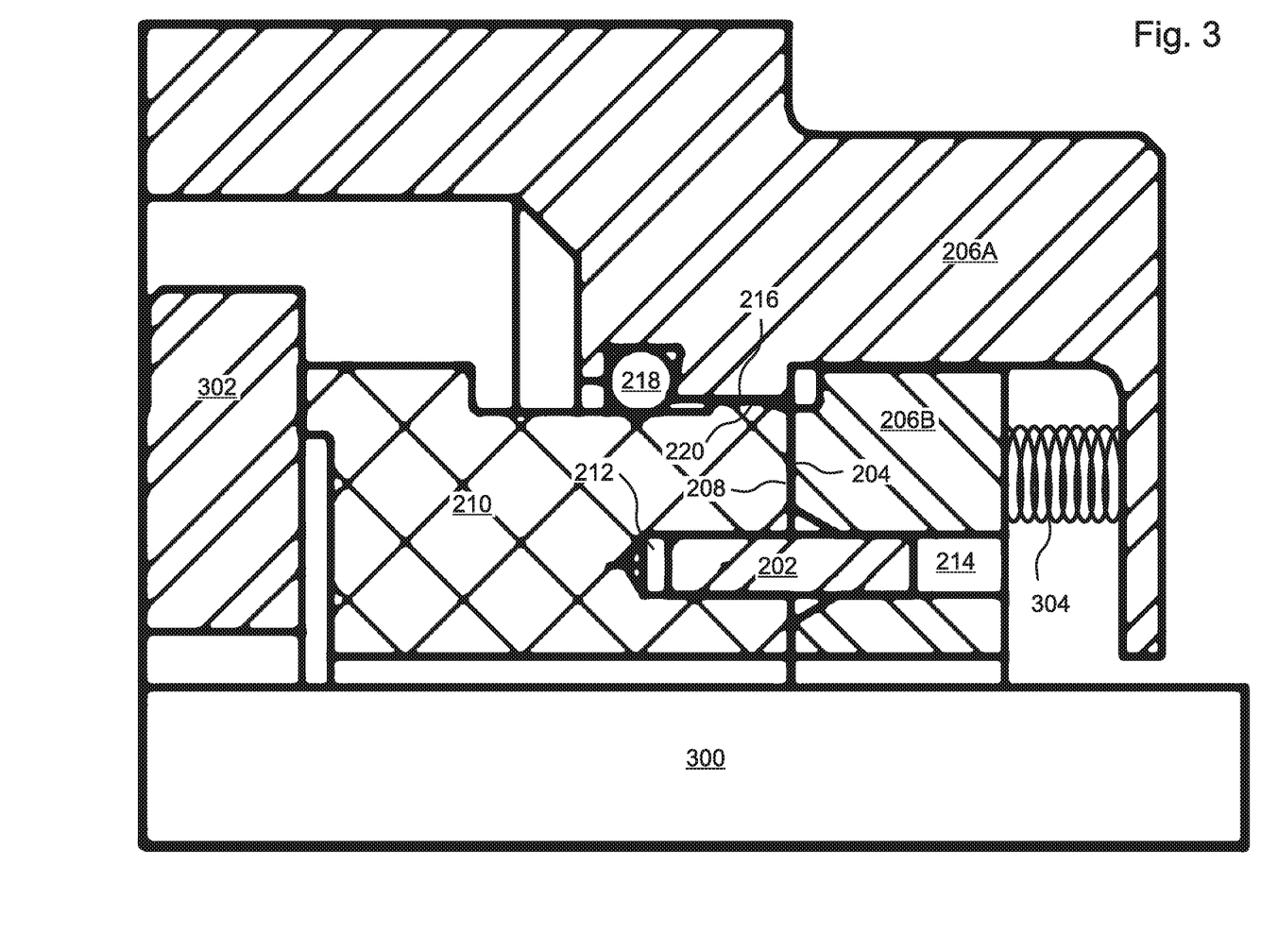
FIG. 3 is a cross-sectional, close-up view showing a split ring half seated in a holder half according to an embodiment of the present invention.

In FIG. 2, the stationary split ring half 210 is shown removed from the holder half 206 and inverted, so that the proximal surface 208 of the splint ring half 210 is visible. FIG. 3 is a sectional view of the embodiment of FIG. 2 in an assembled configuration, where the sectional is taken in a plane that contains the axis of the shaft 300 and that passes through the split ring half 210, support surfaces 204, 216 of the holder half 206, and secondary seal 218. A spring 304 can be seen in FIG. 3 that applies an axial force to the axially mobile element 206B and thereby presses the stationary split ring half 210 toward the corresponding rotating split ring half 302. In similar embodiments, a bellows is included in place of the spring 304 shown in FIG. 3.

Figure 4:
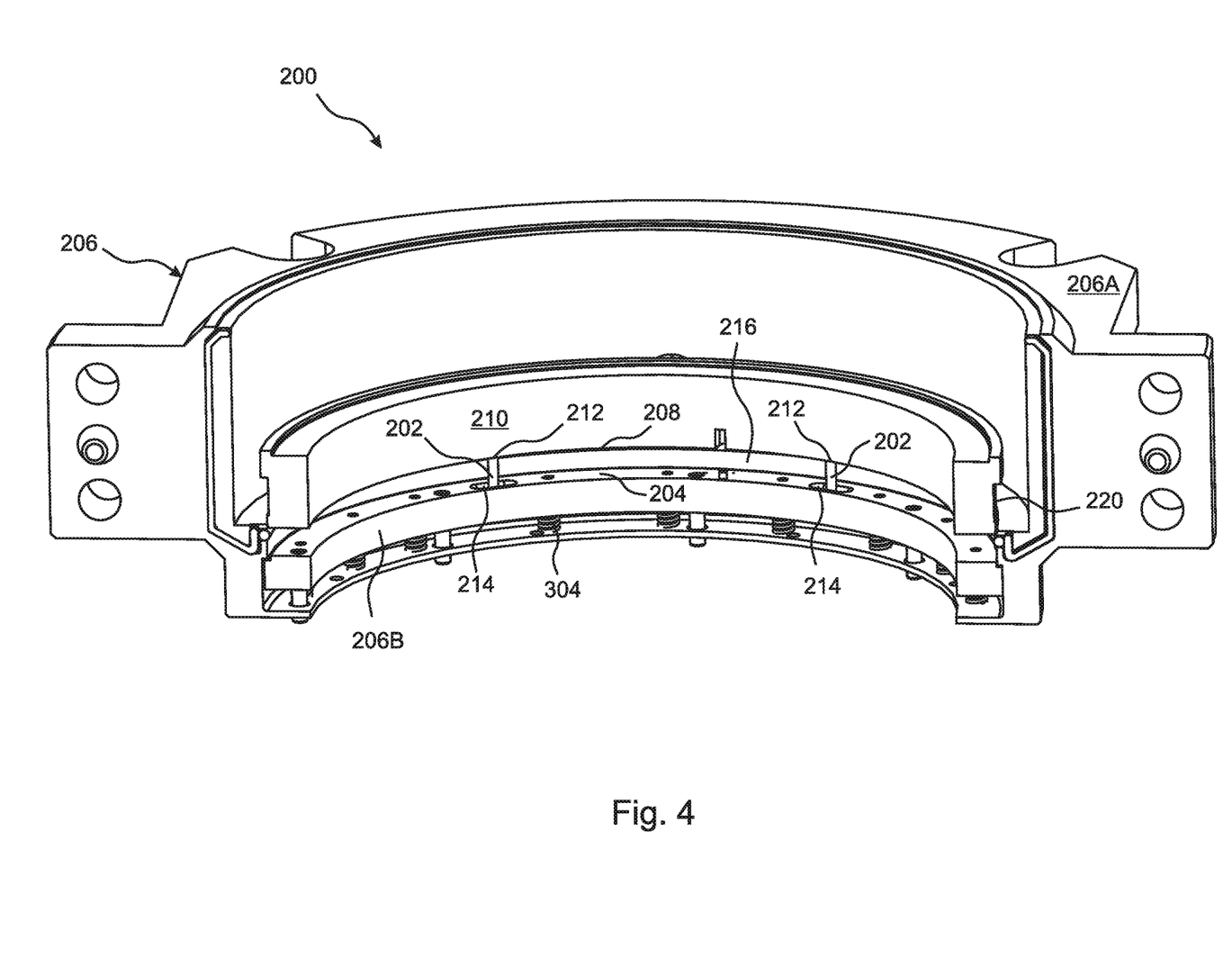
FIG. 4 is a perspective front view of the clamshell half of FIG. 2, showing the seal ring half vertically separated and positioned above the holder half.

FIG. 4 is a perspective view showing the split ring half 210 partially assembled with the holder half 206, in that the split ring half 210 is radially and rotationally positioned for assembly with the holder half 206, and is axially proximal to the mobile element 206B, such that the extended members 202 have been partially inserted into the slots 214 provided in the axial support surface 204 of the mobile element 206B.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications without departing from the spirit thereof. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

We claim:

1. A unitized split seal face clamshell assembly, comprising a pair of clamshell halves configured, when assembled together, to surround a rotating shaft, each of the clamshell halves comprising:
   a holder half having an axial support surface and a radial support surface;
   a split ring half having a distal annular surface configured for forming a mechanical seal, a proximal annular surface configured for seating against the axial support surface of the holder half, and an outer circumference configured for seating against the radial support surface of the holder half;
   an extending member inserted in a hole provided in one of the proximal annular surface of the split ring half and the axial support surface of the holder half, and a corresponding arcuate slot provided in the other of the proximal annular surface of the split ring half and the axial support surface of the holder half, the arcuate slot having a center of curvature that lies on the shaft axis when the clamshell halves are assembled together surrounding the rotating shaft;
   the hole, slot, and extending member being configured such that when the proximal annular surface and the outer circumference of the split ring half are seated respectively against the axial and radial support surfaces of the holder half, the extending member extends from the hole into the arcuate slot, thereby radially fixing the split ring half relative to the holder half while permitting rotation of the split ring half relative to the holder half over a limited rotation range about the shaft axis of between 2 degrees and 20 degrees.

2. The clamshell assembly of claim 1, wherein the holder half comprises a gland half and a mobile element that is axially movable relative to the gland half, the radial support surface being formed on the gland half and the axial support surface being formed on the mobile element.

3. The clamshell assembly of claim 2, wherein the holder half further comprises a spring or bellows configured to apply an axial force to the mobile element relative to the gland half.

4. The clamshell assembly of claim 1, further comprising a secondary seal configured, when the outer circumference of the split ring half is seated against the radial support surface, to:
   form a seal between the holder half and the split ring half; and
   frictionally resist axial displacement of the split ring half relative to the holder half.

5. The clamshell assembly of claim 4, wherein the secondary seal comprises an elastomeric member that is seated in the holder half and extends radially inward therefrom so as to press radially against the split ring half when the outer circumference of the split ring half is seated against the radial support surface.

6. The clamshell assembly of claim 1, wherein the extending element is cylindrical in shape.

7. The clamshell assembly of claim 1, wherein each of the clamshell halves comprises a plurality of corresponding holes, slots, and extending members.

* * * * *